(12) United States Patent
Krieger et al.

(10) Patent No.: US 8,775,779 B2
(45) Date of Patent: Jul. 8, 2014

(54) CONTROLLING ACCESS TO A POWER SUPPLY MEMORY

(75) Inventors: Ken Krieger, Jackson, WY (US); Albert Borchers, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 30 days.

(21) Appl. No.: 12/957,835

(22) Filed: Dec. 1, 2010

(65) Prior Publication Data

US 2011/0078435 A1    Mar. 31, 2011

Related U.S. Application Data

(62) Division of application No. 11/545,944, filed on Oct. 10, 2006, now Pat. No. 7,870,379.

(51) Int. Cl.
*G06F 9/00* (2006.01)
*G06F 9/44* (2006.01)

(52) U.S. Cl.
USPC .............................. 713/1; 713/100; 717/168

(58) Field of Classification Search
USPC ....................................... 713/1, 100; 717/168
See application file for complete search history.

(56) References Cited

U.S. PATENT DOCUMENTS

| | | | |
|---|---|---|---|
| 5,458,991 A | 10/1995 | Severinsky | |
| 5,579,522 A | 11/1996 | Christeson et al. | |
| 5,844,884 A | 12/1998 | Szlenski | |
| 6,009,177 A | 12/1999 | Sudia | |
| 6,584,559 B1 | 6/2003 | Huh et al. | |
| 6,813,672 B1 | 11/2004 | Kamran et al. | |
| 6,824,362 B2 | 11/2004 | Dodson, III | |
| 6,935,130 B2 | 8/2005 | Cheng et al. | |
| 6,937,947 B2 | 8/2005 | Trembley | |
| 7,197,634 B2 | 3/2007 | Kruger et al. | |
| 7,363,520 B1 | 4/2008 | Maier et al. | |
| 7,870,379 B2 * | 1/2011 | Krieger et al. | 713/100 |
| 2004/0139357 A1 * | 7/2004 | Lee | 713/300 |
| 2004/0143828 A1 | 7/2004 | Liu et al. | |
| 2004/0230963 A1 | 11/2004 | Rothman et al. | |
| 2004/0254014 A1 | 12/2004 | Quraishi et al. | |
| 2005/0088201 A1 | 4/2005 | Devlin et al. | |
| 2005/0240601 A1 | 10/2005 | Lyons et al. | |

(Continued)

FOREIGN PATENT DOCUMENTS

KR    2000-0050874    8/2000

OTHER PUBLICATIONS

Office Action mailed Jan. 4, 2012 in related Korean Patent Application No. 2009-7009579 (10 pages).

(Continued)

*Primary Examiner* — Chun Cao
(74) *Attorney, Agent, or Firm* — Fish & Richardson P.C.

(57) ABSTRACT

A system is described that includes a power conversion module, a data port, a controller to receive data from the data port, and a data store containing instructions that when executed by the controller perform operations to control the power conversion module. The operations include executing instructions in a first portion of the data store during booting of the controller, executing instructions in a second portion of the data store after the controller has booted, receiving a signal from the data port indicating the instructions in the second portion are to be modified, receiving from the data port modified instructions to be stored in the second portion, and executing, in response to the signal, the instructions in the first portion to store the modified instructions in the second portion.

25 Claims, 6 Drawing Sheets

(56) References Cited

U.S. PATENT DOCUMENTS

| | | | |
|---|---|---|---|
| 2006/0020832 A1 | 1/2006 | Hung | |
| 2006/0176167 A1 | 8/2006 | Dohrmann | |
| 2006/0275040 A1 | 12/2006 | Franklin | |
| 2006/0277328 A1* | 12/2006 | Cherian et al. | 710/36 |
| 2007/0067634 A1 | 3/2007 | Siegler | |

OTHER PUBLICATIONS

EPO Search Report mailed Jul. 22, 2011 in corresponding European patent application No. 06816708.9 (3 pages).
'Circuit Converts PWM Fan Drive to Linear and Reduces Acoustic Noise' [online]. Maxim/Dallas Semiconductor, 2006, [retrieved on Oct. 23, 2006]. Retrieved from the Internet: <URL: www.maxim-ic.com/appnotes.cfm/an_pk/3530, 3 pages.
'Intelligent Temperature Monitor and PWM Fan Controller' [online]. Analog Devices, 2003, [retrieved on Oct. 24, 2006]. Retrieved from the Internet: <URL: www.analog.com/UploadedFiles/Data_Sheets/ADM1030.pdf#xml=http://search.analog.com/search/pdfPainter.aspx?url=http://www.analog.com/UploadedFiles/Data_Sheets/ADM1030.pdf&fterm=Intelligent&fterm=Temperature&fterm=Intelligent Temperature&la=en>, 28 pages.
'LM64 –+– 1C Remote Diode Temperature Sensor with PWM Fan Control and 5 GPIO's' [online]. National Semiconductor, 2006, [retrieved on Oct. 23, 2006]. Retrieved from the Internet: <URL: http://www.elecdesign.com/Articles/Index.cfm?ArticleID=6281>, 3 pages.
'Low-cost fan manager for power-supply applications' [online]. Electronic Design, 2006, [retrieved on Oct. 23, 2006]. <URL: www.elecdesign.com/Articles/Index.cfm?ArticleID=6281>, 3 pages.
System Management Interface Forum, "PMBus Power System Management Protocol Specification Part 1—General Requirements, Transport and Electrical Interface, Revision 1.0" Mar. 2005, 17 pages.
'T10 Project 1142D—Working Draft SCSI Parallel Interface-2' [online]. American National Standard, 1998, [retrieved on Oct. 23, 2006]. Retrieved from the Internet: <URL: www.t10.org/ftp/t10/drafts/spi2/spi2r20b.pdf >, pp. 181-182.
Final Office Action mailed Apr. 20, 2012 in related Korean Patent Application No. 2009-7009579 (6 pages).
94(3) EPC communication mailed Jul. 29, 2011 in related European Patent Application No. 06816708.9 (6 pages).
PCT/US2006/039715 Int'l Search Report & Written Opinion mailed Nov. 5, 2007 (12 pages).
Office Action of the Intellectual Property Office issued May 24, 2013 in Taiwan Patent Application No. 096138047 (6 pages).
94(3) EPC communication mailed Jun. 19, 2013 in related European Patent Application No. 06816708.9 (3 pages).
PCT/US2006/039715 Int'l Preliminary Report on Patentability mailed Apr. 23, 2009 (9 pages).

\* cited by examiner

CONTROLLING ACCESS TO A POWER SUPPLY MEMORY

CROSS REFERENCE TO RELATED APPLICATION

This application is a divisional and claims the benefit under 35 U.S.C. §120 of U.S. patent application Ser. No. 11/545,944, entitled "Updating a Power Supply Microcontroller," filed Oct. 10, 2006, which is incorporated herein by reference in its entirety.

TECHNICAL FIELD

The following disclosure relates to updating power supply microcontrollers, for example, updating firmware used by the microcontroller to control certain functions of a power supply.

BACKGROUND

To operate, computing systems need a source of power. Certain computing systems include power supplies, which provide power to internal components, such as motherboards, processors, and memory.

Power supplies may convert one form of electrical power to another desired form and voltage. In certain systems, this involves converting 120 or 240 V alternating current supplied by a utility company to a lower direct current voltage used for the internal components.

Power supplies can include switched-mode power supplies and linear regulator power supplies. Certain switched-mode power supplies include a transistor and transformer network that switches the load current rapidly on and off in order to stabilize the output voltage.

Certain linear regulator power supplies use a transformer to convert AC voltage to a lower AC voltage. For example, the linear regulator power supply can rectify the lower AC voltage with one or more diodes. Additionally, these linear regulator power supplies can include a capacitor to smooth out variations in the rectified signal. Next, a linear regulator can be used to decrease the voltage based on the requirements of the circuits powered by the power supply.

SUMMARY

The present specification relates to updating power supplies.

In a first general aspect, a system includes a power conversion module, a data port, a controller to receive data from the data port, and a data store containing instructions that when executed by the controller perform operations to control the power conversion module. The operations include executing instructions in a first portion of the data store during booting of the controller, executing instructions in a second portion of the data store after the controller has booted, receiving a signal from the data port indicating the instructions in the second portion are to be modified, receiving from the data port modified instructions to be stored in the second portion, and executing, in response to the signal, the instructions in the first portion to store the modified instructions in the second portion.

In a second general aspect, a method for loading instructions into a programmable power supply having memory is described. The method includes maintaining a power output for the programmable power supply during instruction loading operations. The instruction loading operations include restricting access to a portion of the programmable power supply's memory, where the memory is coupled to a controller of the programmable power supply. The operations also include receiving instructions through an internal bus used for communication with the power supply, where the received instructions are stored in the portion of the memory, and restoring access to the portion of the memory so that the controller can execute the received instructions.

In another general aspect, a method is described. The method includes loading instructions into a power supply system, and executing instructions in a first portion of a data store during initialization of a controller, wherein the data store and the controller are included in the power supply system. The method also includes executing instructions in a second portion of the data store after the power supply system has been initialized, receiving a signal indicating the instructions in the second portion are to be modified, and executing the instructions in the first portion in response to the signal to store modified instructions in the second portion.

In yet another general aspect, a system is described. The system includes a power converter, a processor, and means for loading instructions while maintaining a power output from the power converter, the instructions to be executed by the processor to control the power converter. Loading the instructions includes executing a first set of instructions to boot the processor, executing a second set of instructions after the processor has booted, receiving a signal to modify the second set of instructions in response to a received signal, receiving a modified set of instructions, and using the first set of instructions to update the second instructions with the modified set of instructions, wherein execution of the second set of instructions is restricted until the update is complete.

The systems and techniques described here may provide one or more of the following advantages. First, cost savings and operational up-time may be increased by upgrading or restoring a power supply's functionality while maintaining the power supply's output. Second, a system may be upgraded conveniently through an internal bus. Third, a system may decrease the probability of executing corrupted or outdated firmware. Fourth, a system may update multiple power supplies at once or in a sequence. Fifth, operational problems related to a system can be repaired by updating firmware. Sixth, a power supply may be upgraded conveniently without removing from the power supply from a system.

The details of one or more embodiments are set forth in the accompanying drawings and the description below. Other features and advantages will be apparent from the description and drawings, and from the claims.

DETAILED DESCRIPTION OF ILLUSTRATIVE EMBODIMENTS

Figure 1:
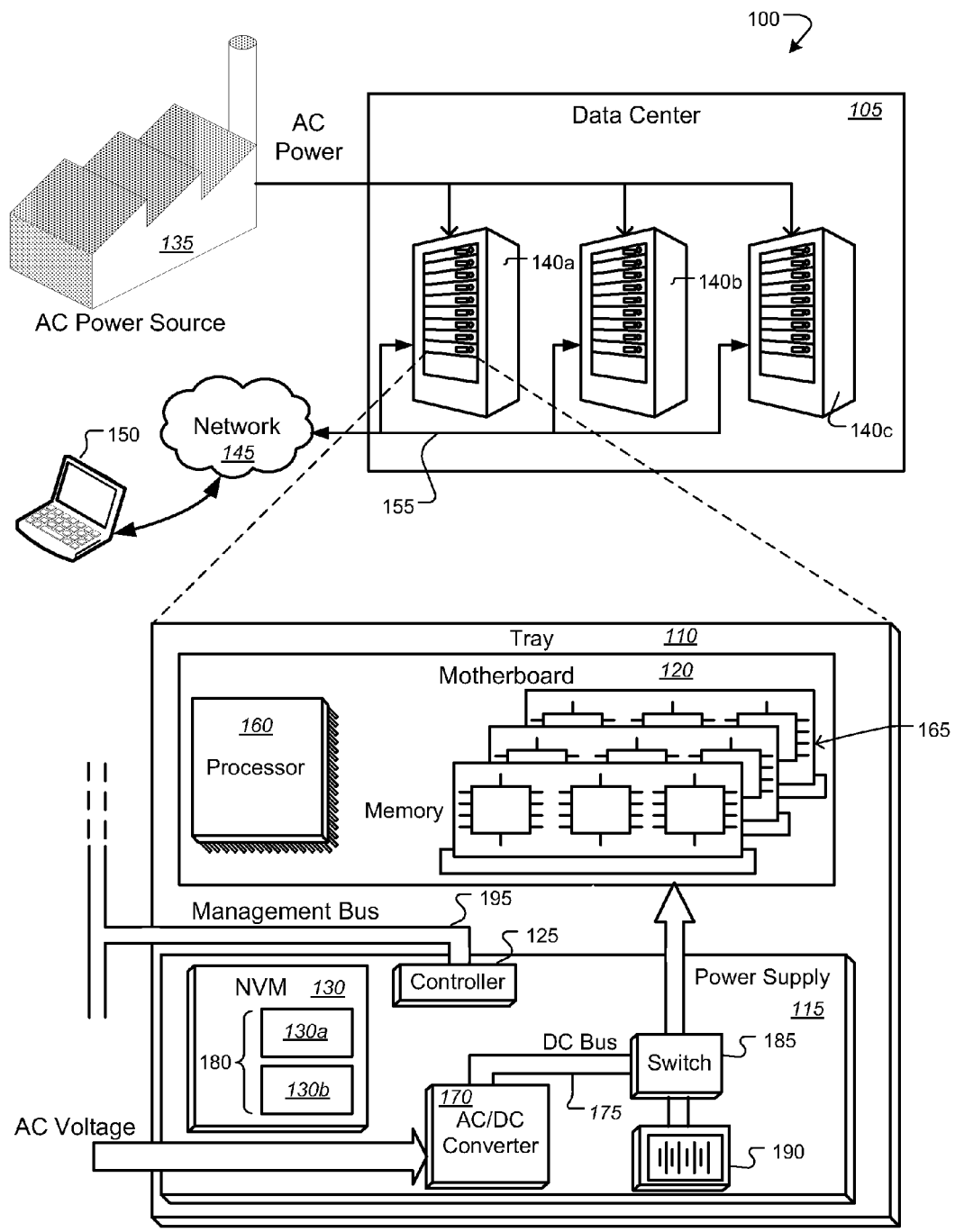
FIG. 1 is a schematic diagram illustrating an exemplary power distribution architecture 100 for a data center 105.

FIG. 1 is a schematic diagram illustrating an exemplary power distribution architecture 100 for a data center 105. The data center 105 includes a number of modular rack-mounted bases (which may also be referred to as trays) 110, each of which can include a power supply 115 integrated with a computer motherboard 120. The power supply 115 includes a controller 125 and a non-volatile memory (NVM) 130 (e.g., an EEPROM, flash memory, etc.). Additionally, although depicted in the schematic as internal, the NVM can be either internal or external to the power supply 115 or the tray 110.

In this example, the NVM 130 includes two memory portions, where one portion stores application firmware 130a and the other stores a boot loader 130b. During normal operation, the controller 125 is configured to execute program instructions stored in the application firmware 130a to control the power supply 115 (e.g., performing fail-safe operations to protect the motherboard 120 when AC power fails and adjusting cooling mechanisms in the power supply). The controller 125 can execute program instructions stored in the boot loader 130b to maintain a power output to the motherboard 120 and to update the program instructions stored in the application firmware 130a.

In some implementations, the boot loader 130b includes instructions that when executed prepare the controller 125 for execution of the application firmware 130a, for example, the boot loader 130b instructions may reset variables within the controller and load addresses or points used by the controller to execute the application firmware 130a.

In the depicted example, the data center 105 receives AC power from an AC power source 135. For example, the AC power source 135 may deliver substantially symmetric three phase voltages suitable for powering substantially balanced three phase loads. In some implementations, the AC power may be received from an electric utility grid, a hydropower plant, a wind turbine system, a photovoltaic power system, or a combination thereof. In other implementations, the AC power source may be a tidal power plant that includes wave-to-electricity converters (e.g., Pelamis commercially available from Ocean Power Delivery Limited of Edinburgh, United Kingdom) to supply power to a water-based data center, for example.

The data center 105 includes a number of racks 140a, 140b, and 140c. Each of the racks 140a-c includes a number of the trays 110. The racks 140a-140c may be powered by the AC power that is delivered to the data center 105 from the electric utility 135. In some implementations, the racks 140a-c provide structures to facilitate the operations of the trays 110. For example, the racks 140a-c may include power cables to supply AC power to the trays 110 and tubes to supply liquid coolant to the trays 110. Additionally, the racks 140a-c may also include network cables that link the trays 110 in the racks 140a-c so that information can be exchanged between the trays 110 the data center 105.

The architecture 100 includes a network 145 and a remote computer 150. Each of the racks 140a-c is coupled to a network connection 155. The network connection 155 provides an information channel to the network 145, which may include, for example, a local area network, virtual private network, wide area network (e.g., the Internet), or a combination of such networks, which may be wired, fiber optic, and/or wireless. The computer 150 represents one of many possible devices that could communicate data directly or indirectly with one or more trays to access, store, process, and/or retrieve information using a processor 160 and associated memory 165 on the motherboard 120. In some implementations, additional processors (e.g., servers) may facilitate such communication. For example, the computer 150 may be included in a server, a desktop computer, a laptop computer, and/or a handheld processor-based device. One or more servers may pre- or post-process, supervise, route, and/or balance the flow of data associated with the communication.

By coupling the trays 110 to the network 145, the data center 105 can provide various services to network users. For example, the data center 105 can store various network information that a user of the computer 150 can search via the network 145. In another example, the user of the computer 150 can use the data center 105 to execute applications (e.g., word processing applications) remotely via the network 145. In another example, the data center 105 can be a security data center that store security data for the computer 150. In another example, the data center 105 can execute security critical operations, such as monetary transactions for clients of a bank.

In some implementations, the data center 105 can execute processing operations using one or a combination of more than one of the trays 110. As shown, each of the trays 110 provides processing functionality to the data center 105 using the motherboard 120. In various implementations, the motherboard 120 may include two, three, four, or any other practicable number of processors 160. Each of the processors 160 can execute instructions stored in the memory 165, for example. In some embodiments, the motherboard 120 may be replaced with tray of data storage devices (e.g., hard disc drives, flash memory, RAM, or any of these or other types of memory in combination). The memory 165 may include volatile and/or non-volatile memory that may be read and/or written to by the processor 160. The motherboard 120 may further include some or all of a central processor unit(s) (CPU), networking devices, memory (e.g., cache, non-volatile, flash), and/or disk drives, for example, along with various memories, chip sets, and associated support circuitry.

The motherboard 120 operates using the DC power supplied from the power supply 115. As shown, an AC input voltage signal is delivered to each of the trays 110 to be processed by the power supply 115. In some examples, the AC input voltage signal may be received from the AC power source 135 via the power cables in the racks 140a-c connecting each of the trays 110. The power supply 115 includes an AC-to-DC converter 170 that converts the AC input voltage signal to a regulated DC voltage. The converter 170 outputs the regulated DC voltage onto a DC bus 175. In some implementations, the AC-to-DC converter 170 may regulate the DC voltage to a static voltage set point. In some other implementations, the voltage set point may be dynamically determined. For example, the power supply 115 can determine the voltage set point based on, for example, a present temperature of the motherboard 120.

Various operations in the power supply 115 are controlled by the controller 125. For example, the controller 125 can execute application firmware 130a to perform power management operations, such as determining the voltage set point of the power output, monitoring signal quality of the AC input voltage signal, monitoring temperature in the power supply 115, and/or other power management functions. In some implementations, the controller 125 can execute the application firmware 130a to control a speed of a cooling fan in the power supply 115 to regulate the air flow and cooling effects for the power supply 115. For example, when the temperature of the power supply 115 rises, the controller 125 can increase the fan speed to cool down the power supply 115 to avoid damage in the power supply 115 due to excessive heat.

In some implementations, the controller 125 executes instructions in the application firmware 130a that perform fail-safe operations to keep the motherboard 120 operational during an AC power failure. In some examples, the AC power failure may cause or potentially cause improper operation of the motherboard 120. As an illustrative example, when a fault condition in the AC input voltage signal is detected by the controller 125 (e.g., by detecting a root mean square (r.m.s.) of the input voltage signal to be less than a voltage threshold, or by detecting a frequency of the input voltage signal to be lower than a frequency threshold for a predetermined period of time), the controller 125 can control a switch 185 to connect a battery 190 to the DC bus 175 so that the motherboard 120 can continue to operate without substantial interruption. The battery 190 may continue to provide operating power to the circuits on the motherboard 115 until the battery 190 substantially discharges. In some implementations, the controller 125 can monitor the battery 190. When the battery 190 is substantially discharged, the controller 125 can execute power down operations so as to avoid, for example, data loss from power loss in the motherboard 120. In some implementations, when the AC power is restored, the controller 125 can perform operations to transition from using the battery 190 to the AC/DC converter 170 to supply power to the motherboard 120.

In some implementations, the controller 125 can also receive commands and data from a management bus 195 via a wired connection (e.g., through a System management bus (SMBus), an inter-integrated circuit ($I^2C$) bus, a power management bus (PMBus), a twisted pair bus, power lines (such as those providing the AC power to the power supply 115), etc.). In other implementations, the controller 125 receives commands and data from the management bus wirelessly (e.g., through a radio frequency (RF) connection, a Bluetooth connection, a wireless LAN connection, infrared, or through other wireless/mobile communication protocols).

In some implementations, the controller 125 can perform operations to update the program instructions in the NVM 130 while supplying power to the motherboard continuously. For example, the controller 125 may determine whether an update of the program instructions is permitted based on present conditions of the power supply 115 (e.g., the stability and presence of the AC input signal, the presence of a battery, the remaining battery life of the battery, etc.) Some examples of the operations that can be performed by the controller 125 to update program instructions in the NVM 130 are described with reference to FIGS. 2-5.

Program instructions for performing the fail-safe operations, the power supply condition monitoring operations, and the communication operations between the power supply 115 and the remote host, for example, are stored in the NVM 130. In some implementations, the controller 125 can perform a checksum operation to verify and maintain the integrity of the program instructions stored in the NVM 130. For example, if the checksum operation detects an error in the application firmware 130a, the controller 125 may notify the remote host to download a replacement of the application firmware.

In the depicted example, the NVM 130 includes a plurality of memory portions 180, where one portion of the memory includes the application firmware 130a and one portion includes the boot loader 130b. The application firmware portion 130a and the boot loader 130b may be independent sets of program instructions in the NVM 130. In one implementation, each of the independent sets of program instructions can be executed by the controller 125 to maintain power output to the motherboard 120. In another implementation, the power output is independent of the functionality of the controller 125 and the program instructions stored in the non-volatile memory (NVM) 130.

In some implementations, the application firmware 130a and the boot loader 103b each contain specialized instructions that are independent of instructions stored in other portions of the NVM 130. For example, the application firmware 130a may have instructions that when executed monitor a temperature of fan exhaust and adjust a fan speed based on this temperature or the application firmware can include instructions that outline a power failure protection process for switching over to the battery if the AC power becomes unstable during normal operation, whereas the boot loader 130b may be responsible for initializing the startup sequences for the application firmware and managing a firmware update process used to update, or modify, the firmware application 130a.

By executing the program instructions in the boot loader 130b, the controller 125 can modify instructions for the application firmware portion 130a while supplying power continuously to the motherboard 120. For example, the firmware updates can upgrade the operations of the power supply 115 (e.g., adding additional power supply control features or correcting errors in operations of the power supply 115). In another example, the firmware updates can change some of the parameters used by the power supply 115 (e.g., the fan speed, the DC output voltage, or other operation parameters).

During the firmware update process, the controller 125 and the power supply 115 can remain functional so that the power supply supplies a substantially continuous power output to the motherboard 120. In some implementations, the program instructions stored in the boot loader 130b may include operations that are used for replacing, deleting, supplementing, or modifying program instructions in the application firmware 130a without interrupting power output to the motherboard 120.

FIGS. 2-5 are flow diagrams that illustrate some examples of methods that the controller 125 can use to update program instructions in one of the memory portions 180 (e.g., the application firmware 130a) while continuously supplying power to the motherboard 120. For example, the power distribution architecture 100 may receive updates from an administrator of the system 100 that includes the power supply 115, where the updates include instructions to modify the application firmware of the power supply 115. The controller 125 can use some of the methods described below to replace the application firmware portion 130a (or other memory portions of the NVM).

Figure 2:
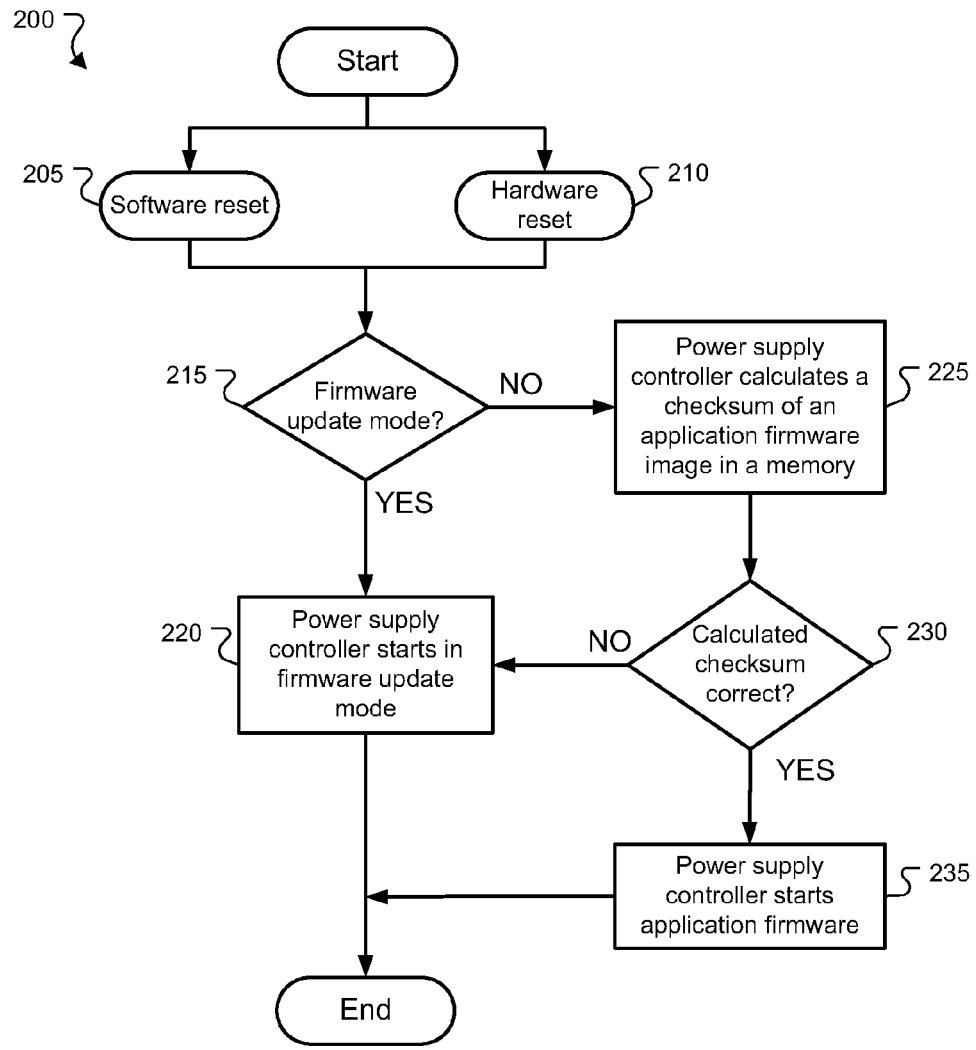
FIG. 2 shows an example method that a controller of a power supply can use as a start-up sequence for the controller.

FIG. 2 shows an exemplary method 200 that a controller of a power supply can use as a start-up sequence for the controller. For example, the controller 125 may perform the method to restart the power supply 115, or a portion of the power supply (e.g., restarting the controller 125 while maintaining a substantially stable power output to the motherboard 120), after a hardware reset or a software reset. In some cases, a controller of a power supply can use the method 200 to determine which of the memory portions are accessed by the controller 125 for execution.

For example, the controller 125 uses the method 200 to determine whether the application firmware 130a or the boot loader 130b is to be used to control the power supply 115. During a startup process, a controller of a power supply can also perform the method 200 to check the integrity of the memory portions. For example, performing the method 200 may substantially reduce and/or prevent the controller from executing program instructions that have been corrupted or erroneously modified.

In general, a controller can use the method 200 when the controller is reset using software or hardware. The method 200 may further be performed under the control, supervision, and/or monitoring of the controller 125 (or other processing modules) in the system 100. Operations may also be supplemented or augmented by other processing and/or control elements that may be in operative communication with the controller through a network connection 155 coupled to the tray 110. Some or all of the operations may be performed by one or more processors executing instructions tangibly embodied in a signal. The processing may be implemented using analog and/or digital hardware or techniques, either alone or in cooperation with one or more processors executing instructions.

The method 200 begins when the controller receives a software reset 205 or a hardware reset 210. For example, the controller 125 can receive a software reset after the controller 125 executes a reset instruction. In another example, the power supply 115 can be reset when the controller 125 receives a software reset instruction from the remote host, such as after the controller has updated the application firmware 130a. In another example, the controller 125 can receive a hardware reset after the power supply 115 is powered up after being introduced into the system 100.

Next, the controller determines whether the power supply operates in a firmware update mode in step 215. In some implementations, the power supply 115 may be operating in various operating modes, including, for example, the firmware update mode (e.g., boot loader mode) and a normal operating mode (e.g., application firmware mode). For example, when the power supply 115 is operating in the firmware update mode, the controller 125 can execute operations to update the application firmware 130a.

In some implementations, the controller 125 can check a status bit or a status register of the controller 125 or in the NVM 130 to determine the present operating mode of the power supply 115. For example, the controller 125 can check a boot flag register in the NVM 130. If the boot flag register stores a value of zero, then the controller 125 determines that, for example, the power supply 115 is operating in the firmware update mode. Otherwise, the controller 125 can determine that the power supply 115 is operating in the normal operating mode.

The operating mode of the power supply can be set in a previous session before the software or the hardware reset is executed. For example, the remote host can transmit a reset instruction to the controller and specify an operating mode (e.g., firmware update mode or normal operating mode) to be executed after reset. In another example, the power supply may be restarted in a predetermined operating mode (e.g., the firmware update mode) when a reset is issued due to certain events (e.g., a sudden shutdown).

If the controller determines that the power supply is in the firmware update mode, then, in step 220, the controller starts the power supply in firmware update mode and the method 200 ends. If the controller determines that the power supply is not in the firmware update mode, then the controller calculates, in step 225, a checksum of an application image in a memory. For example, the controller 125 can perform the checksum operation to protect the integrity of the program instructions in the NVM 130 from, for example, accidental data modifications due to memory corruptions or system errors. In some implementations, the controller 125 may add up basic components (e.g., each byte) of the stored instructions in the application firmware image in the NVM 130. In other implementations, the controller 125 may perform a cyclic redundancy check (CRC) to generate the checksum or other operations to calculate the checksum.

In step 230, the controller determines whether the calculated checksum is correct. For example, the controller can compare the calculated checksum to a checksum of the application firmware that was previously calculated and stored in a register in the NVM 130. If the two values match, then the controller 125 can determine that the application firmware image in the NVM 130 is correct. If the two values do not match, then the controller 125 can determine that the application firmware image in the NVM 130 is not correct.

In another implementation, the controller 125 can transmit the calculated checksum to a host (such as the firmware update host shown in FIG. 6) for verification. For example, the host can store a checksum of the last application firmware update transmitted to the power supply 115. The controller 125 transmits the calculated checksum to the host for verification that the calculated check sum is substantially equivalent to the checksum stored by the host. If the calculated checksum and the previously stored checksum agree, the host can transmit an indicator to the controller specifying that the checksums are substantially equivalent. Otherwise, the host can indicate that the checksums do not match and that the controller should initiate actions to update or modify the application firmware.

If the controller determines that the calculated checksum is not correct in step 230, then the step 220 is executed as described above. If the controller determines that the calculated checksum is correct, then the controller starts, in step 235, executing instructions from the application firmware and the method 200 ends.

Figure 3:
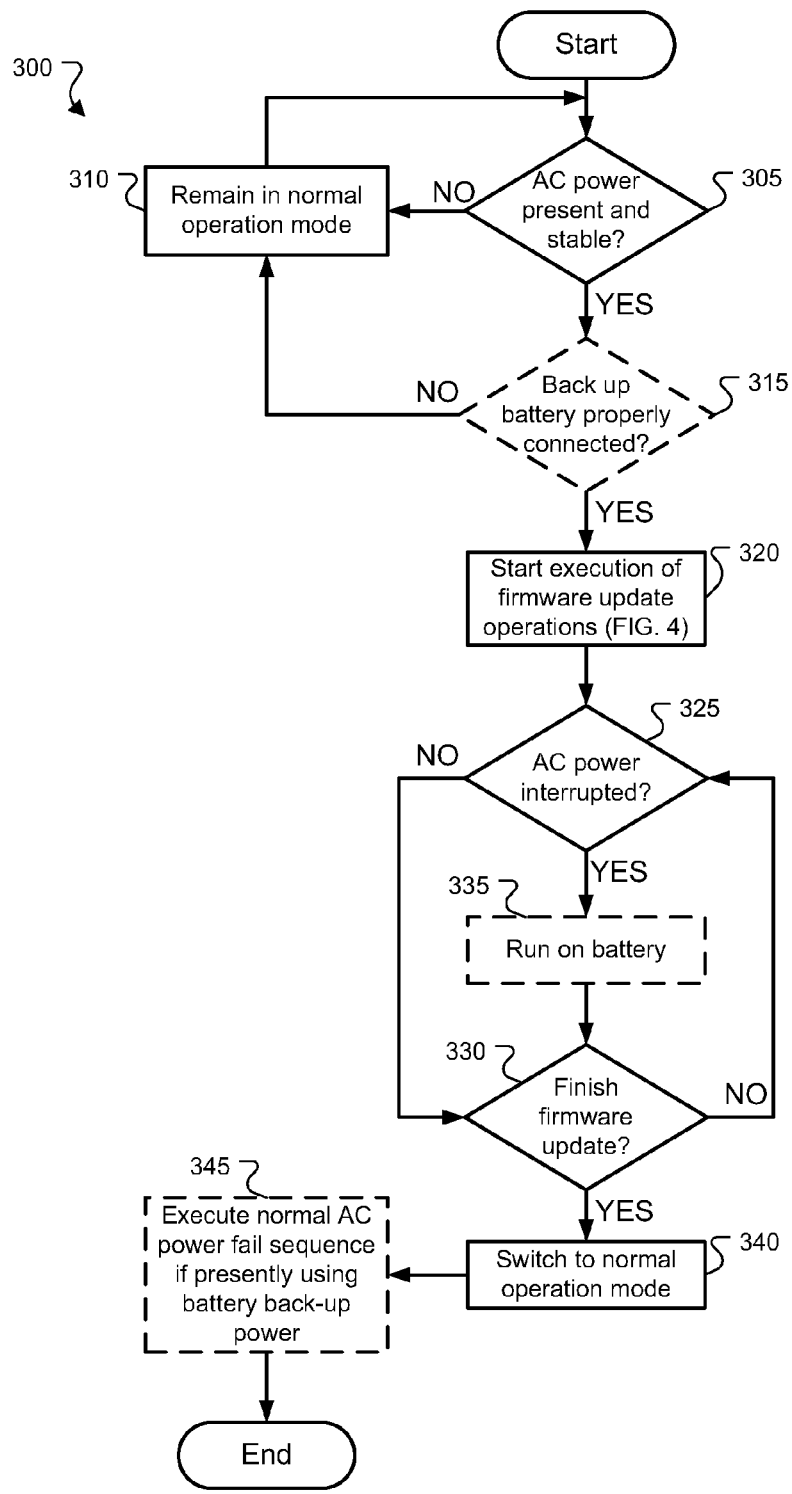
FIG. 3 shows an example method performed by a controller of a power supply during a firmware update for the power supply.

FIG. 3 shows an example of a method 300 that a controller of a power supply can perform when the application firmware 130a in a memory of the power supply is being updated. In some implementations, the controller 125 can use the method 300 to avoid power failures during a firmware update process. In general, the method 300 includes operations to prevent power failures to the controller 125 and fail-safe operations to continue the firmware update process if a main power supply, such as the AC power source 135, fails.

In some implementations, some or all operations in the method 300 may be executed after the step 215 is executed in the method 200 (FIG. 2). In some implementations, the controller 125 can perform operations in the method 300 when the controller 125 receives an update firmware command from the remote host.

The method 300 begins in step 305 by determining whether AC power is present and stable. For example, the controller 125 can measure the r.m.s. (root mean square) value of the magnitude and the frequency of the input voltage signal to determine whether the AC power is present and stable. If the AC power is not present or stable, then the power supply controller remains in the normal operating mode (e.g. application firmware mode) in step 310. If the AC power is present and, for example, has a relatively stable voltage magnitude and frequency, then the power supply controller can determine, in optional step 315, whether a back up battery is property connected. For example, the controller 125 can detect the presence of the battery 190 and can determine whether the battery is correctly installed based on a measured output voltage of the battery, charge counting, previous battery tests, or other methods. However, the power supply 115 does not require the inclusion of a back up battery. If the power supply 115 does not include a back up battery then the method 300 can proceed from step 305 to step 320 if AC power is present and stable.

In optional step 315, if the back up battery is not property connected, then the step 310 is executed as described above. If the back up battery is property connected, then firmware update operations begin in step 320. Some examples of operations for updating firmware in a power supply without interrupting power output are described with reference to FIG. 4.

Next, the controller determines, in step 325, whether the AC power has been interrupted during the execution of the firmware update instructions. If the AC power is not interrupted, then the controller 125 determines whether the firmware update process is finished in step 330. If the firmware update process is not finished, then the controller continues to monitor the AC power by executing step 325.

In the step 325, if the AC power is interrupted, then the power supply and the controller can switch to the back up battery in optional step 335, and the controller can monitor the progress of the firmware update for completion as described in step 330.

As described above, the power supply need not include the back up battery. In certain implementations without a battery, the tray 110 powers down if AC power is interrupted during execution of the firmware update. When the tray is booted after losing power, the controller can start in boot loader mode and initiate the firmware update operations again as described in association with FIG. 2.

If the firmware update process is finished as determined in step 330, then, in step 340, the controller switches to operate in the normal operation mode and the method 300 ends. Optionally, the controller may execute normal AC power fail sequence if the power supply is presently using battery backup power in step 345.

Figure 4:
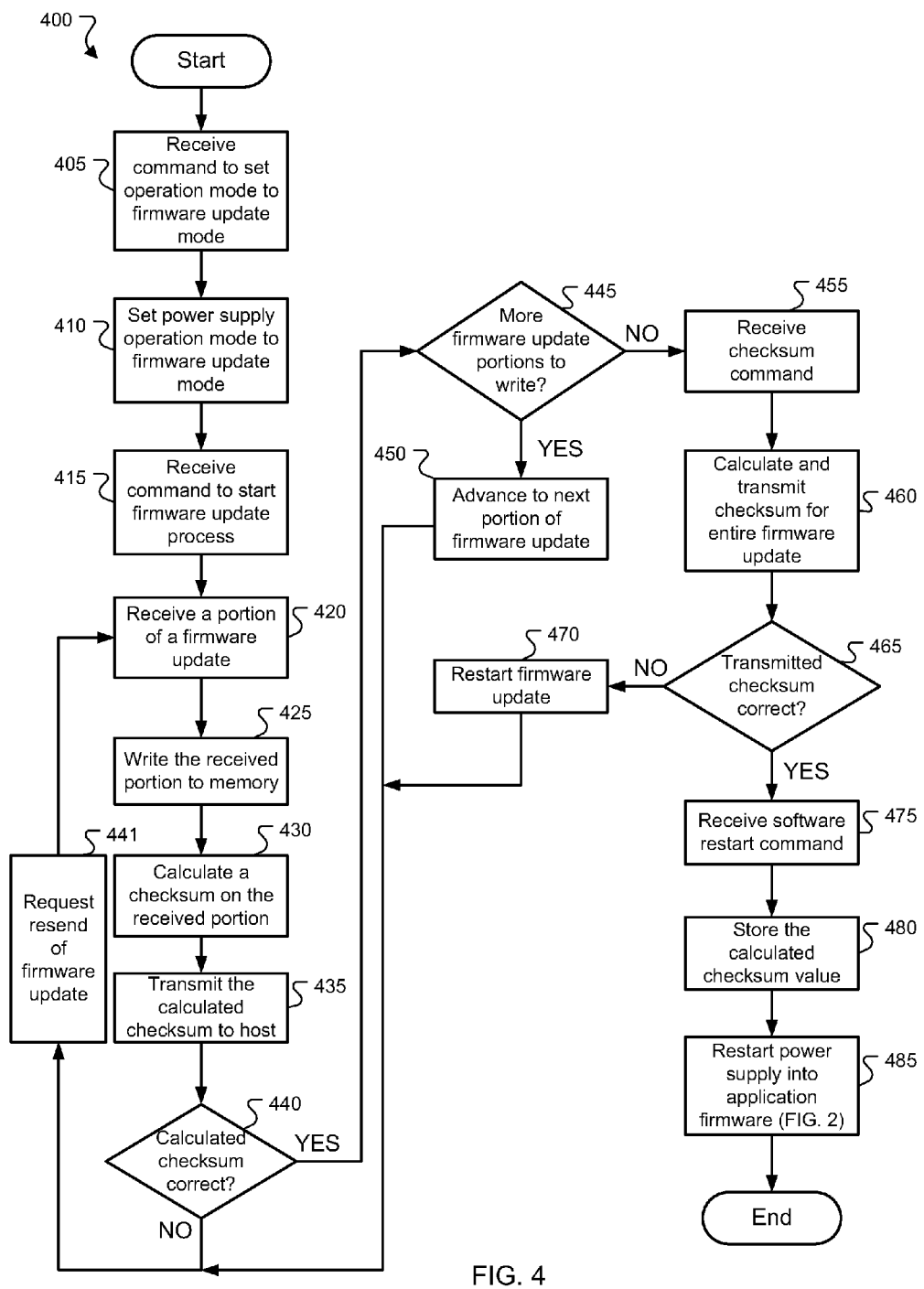
FIG. 4 shows a more detailed method of a firmware update step of FIG. 3.

FIG. 4 shows an example of a method 400 that a controller of a power supply can use to update an application firmware of the controller while maintaining a substantially stable power output. In general, while maintaining the power output of the power supply, the controller can use the method 400 to receive an update for a memory portion (e.g., the application firmware 130a) and protect data integrity of the received update portion. For example, the controller 125 can perform one or more checksum operations on the received data to detect errors in the received data.

The method 400 begins in step 405 when the controller receives a command to set the operation mode to the firmware update mode. For example, the controller may receive a command from the remote host to restart the controller in firmware update mode.

In step 410, the controller sets a power supply operation mode to the firmware update mode. In some implementations, the controller may check the main power and the backup power available for the power supply when performing the step 410. For example, the controller can perform the method 300 when performing the step 410.

Next, the controller may receive a command to start firmware update process in step 415. After setting the power supply operation in the firmware update mode, the controller receives, in step 420, a portion of a firmware update. For example, a complete firmware update can be segmented into portions, which can be separately transmitted from a host to the controller 125. In some implementations, the portion of a firmware update is transmitted in one or more data packets.

In one implantation, the controller can segment each portion into smaller portions once received at the controller. For example, the larger portion can be segmented to accommodate a maximum block transfer size of a bus used to update the NVM. In a more specific example, the portion of a firmware update can be substantially equivalent to 64 bytes, which may be the size of a memory page in the NVM. Before transmission to the NVM, the portion can be segmented into two 32-byte portions, where one portion represents a high byte portion of the larger 64-byte portion, and the other portion represents a low byte portion of the larger 64-byte portion. Each smaller portion can then be separately transmitted to the NVM using the bus with a maximum block transfer size of 32-bytes.

In step 425, the controller writes the received portion to a memory, such as the portion 130a of NVM 130. In some implementations, the controller may combine more than one received data packets to form the entire firmware update portion before writing into the memory. For example, the controller can combine the low byte and the high byte of the firmware update portion before writing a full word into the memory.

Next, the controller calculates a checksum on the received portion in step 430 and transmits, in step 435 the calculated checksum to the remote host. In step 440, the controller determines whether the calculated checksum is correct. For example, the controller 125 may receive, via the management bus 195, a message from the remote host indicating whether the calculated checksum is correct. If the calculated checksum is determined to be not correct, then step 441 is executed, where the controller requests retransmission of the firmware update and the step 420 is repeated so that the received portion is retransmitted from the host to the controller.

In some implementations, the step 430 can occur before the step 425. For example, the controller can calculate a checksum of the firmware portion (or the entire received firmware update) before the firmware portion is written to the NVM. The controller can compare the checksum to a pre-calculated checksum (e.g., a checksum that was calculated by the firmware update host before transmission of the firmware or firmware portion to the power supply). If the checksums do not match, then the controller may not write the checksum to memory, but instead, the controller may request retransmission of the firmware.

If the calculated checksum is determined to be correct, then, the controller or host determines, in step 445, whether there are more firmware update portions to write to complete the firmware update. In some implementations, the controller may include a counter and store a total size of the firmware update. For example, the controller can use the counter to count the size of the received firmware update in this session and compare the counter value with the total size of the firmware update (previously transmitted by the host) to determine whether there are more firmware update portions to write.

If, in step 445, the controller determines that there are more firmware update portions to write, then the controller advances, in step 450, to a next portion of the firmware update and the step 420 is repeated. If there are no more firmware update portions to write, then a checksum command is received in step 455. In step 460, the controller calculates and transmits a checksum for the entire firmware update to, for example, the remote host. In a next step 465, the controller determines whether the transmitted checksum for the entire firmware update is correct.

If the controller determines that the transmitted checksum is not correct, then the controller may restart the firmware update in step 470 and the steps 420-465 are repeated.

If the controller determines that the transmitted checksum is correct, then the controller, in step 475, can receive a software restart command. In some implementations, before receiving the software restart command from the host, the controller receives a query from the host regarding the status of the firmware update process. If the controller transmits, for example, a response indicating that the firmware update is successfully installed, then the host may send the software restart command. Otherwise, the host may, for example, wait for a predetermined time and transmit the query to the controller for the present firmware update status.

Next, the controller stores the calculated checksum of the updated firmware in step 480. In some implementations, the controller can use the stored checksum to verify that the firmware has not been erroneously modified or corrupted as described in association with step 230 of FIG. 2. In step 485, the controller restarts the power supply in normal operating mode (e.g., application firmware mode) that uses the updated application firmware, and the method 400 ends.

Figure 5:
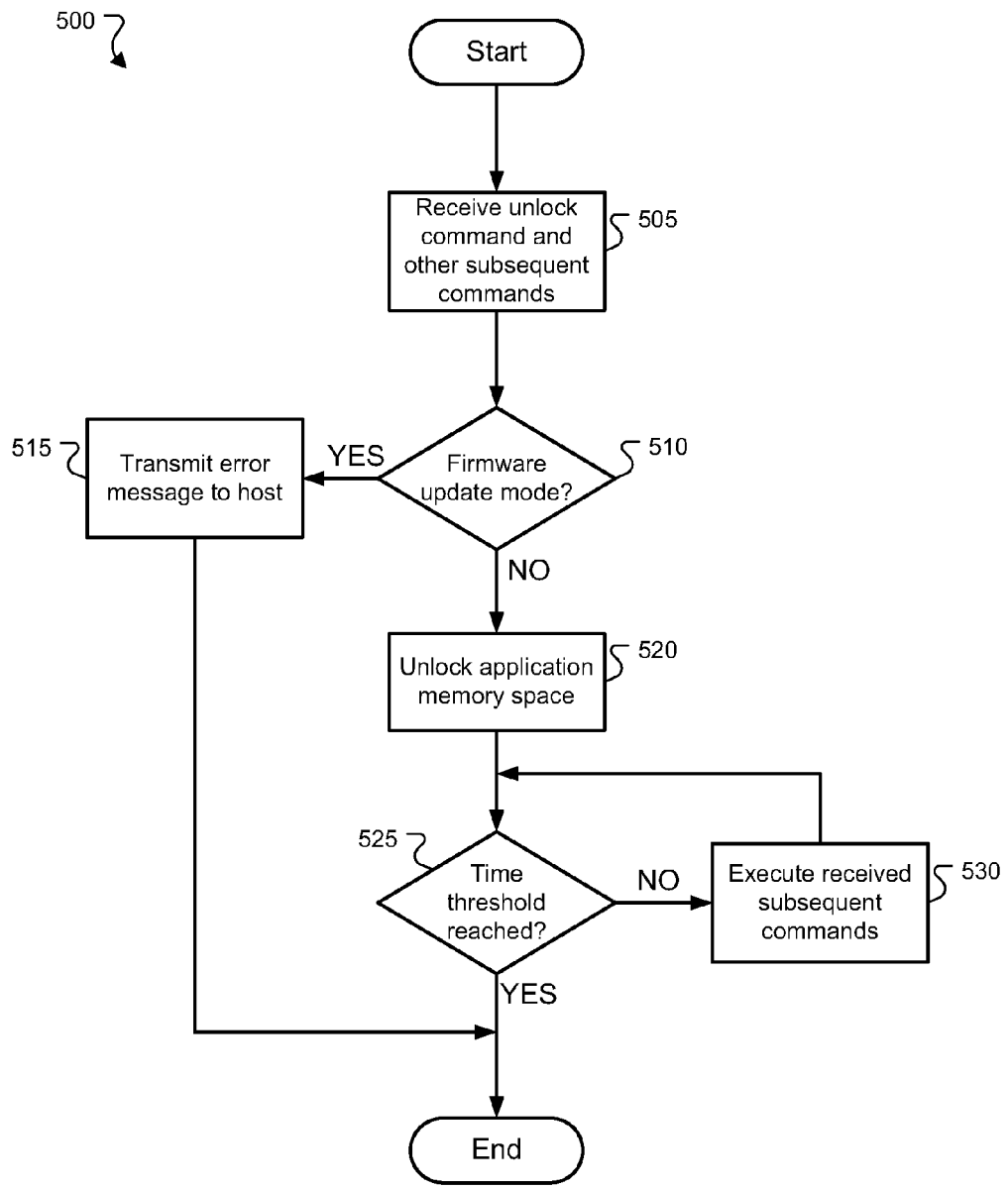
FIG. 5 shows an example of a method that a controller of a power supply can use to restrict access to a portion of memory during the firmware update process.

FIG. 5 shows an example of a method 500 that a controller of a power supply can use to restrict access to a portion of memory during the firmware update process. In the depicted method 500, the portion of memory is an application memory space in which the controller 125 uses to execute commands received from a remote host.

To maintain data integrity, a memory portion (e.g., the application firmware 130*a*) may not be accessible unless a unlock command is received from the remote host, and the power supply is operating in the normal operating mode (e.g., in application firmware mode). Accordingly, by switching to an initialization mode, such as boot loader mode, the controller 125 can restrict access to an application firmware. In some implementations, this restriction is used to prevent access to the application firmware 130*a* while it is being updated.

Specifically, the controller 125 can set the application firmware 130*a* of the NVM 130 to be inaccessible unless a unlock command is received from the remote host via the management bus 195 and unless the power supply 115 is operating in the normal operating mode. When the power supply 115 is operating in the firmware update mode, the controller 125 can restrict access to the application firmware portion until the controller 125 switches the operating mode of the power supply 115 back to the normal operating mode. By restricting access to the portion being updated, the controller is prevented from executing instructions stored in the portion.

The method 500 begins in step 505 when the controller receives an unlock command and other subsequent commands. Next, the controller, in step 510, determines whether the power supply 115 is in the firmware update mode. If the controller determines that the power supply 115 is in the firmware update mode, then the controller transmits an error message to the remote host indicating that presently no application firmware command can be executed in step 515, and the method 500 ends.

In step 510, if the controller determines that the power supply 115 is not in the firmware update mode, then the controller unlocks, in step 520, the application memory space in response to the unlock commands.

Next, the controller checks whether a time threshold is reached in step 525. For example, the unlock command may only unlock the application memory space for a limited period of time, such as one second. The commands subsequent to the unlock command that are received within one second of the unlock command can be executed. If the controller determines that the time threshold is reached (e.g., one second has lapsed), then the method 500 ends. If the controller determines that the time threshold is not reached, then the controller executes the received subsequent commands in step 530.

In other implementations, the method 500 can be modified so that it substantially prevents malicious or unintentional commands from being executed by the controller. For example, the unlock command may be required before any command is executed by the controller, regardless of whether the controller is updating the firmware or not.

This requirement may prevent computing devices in communication with the power supply 115 from causing the controller to execute unauthorized commands. In this implementation, the steps 510, 515, and 520 can be eliminated. Unless the computing device supplies an unlock command, subsequent commands are not executed by the controller. If an unlock command is transmitted (step 550), the following commands are considered legitimate and authorized. The method proceeds to step 525 to determine if the time threshold for execution has lapsed, and if not, any subsequent commands are executed by the controller (step 530). If the time threshold has lapsed, the controller no longer executes received commands unless proceeded by another unlock command.

Figure 6:
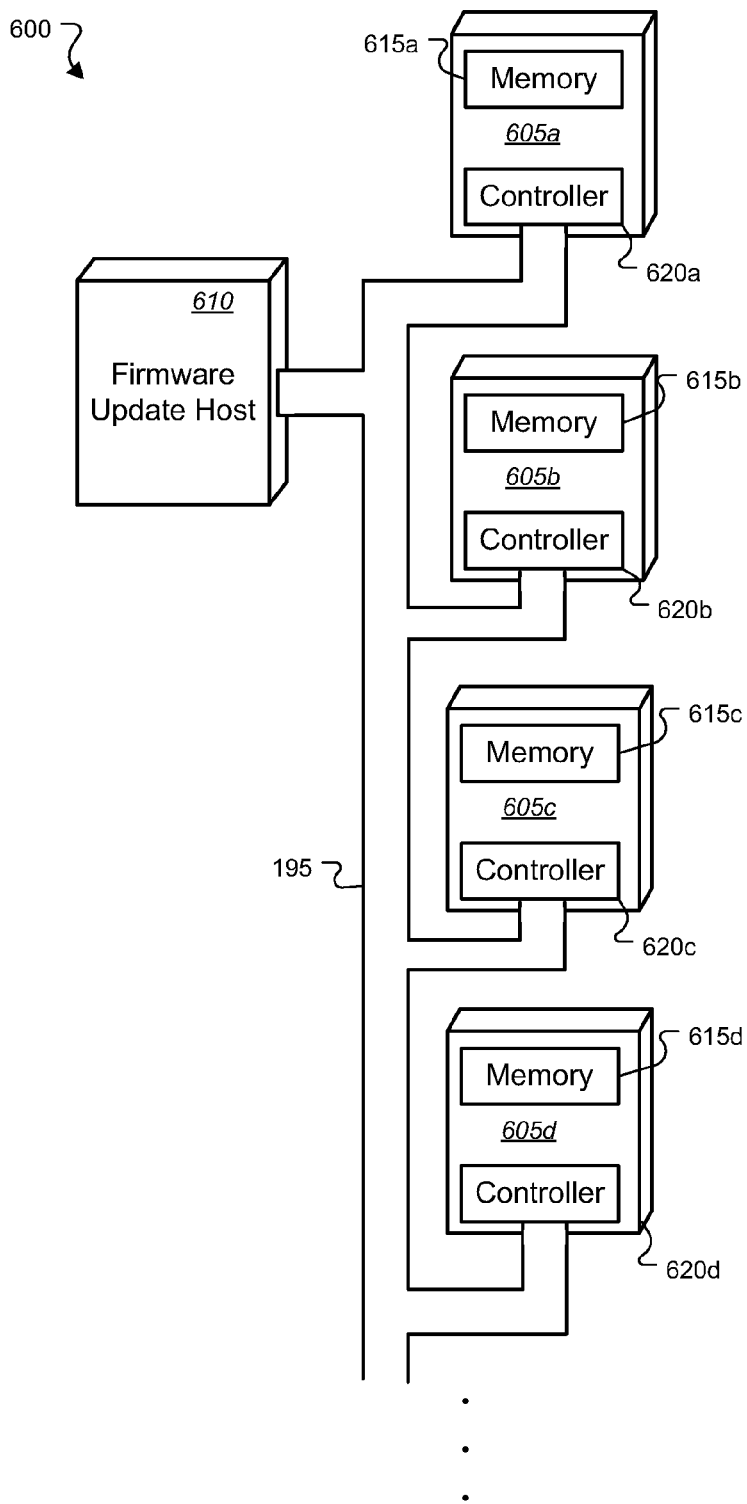
FIG. 6 is a schematic diagram illustrating an example of a power delivery system that includes a plurality of power supply management units (PSMU).

FIG. 6 is a schematic diagram illustrating an example of a power delivery system 600 that includes a plurality of power supply management units (PSMUs) 605*a*, 605*b*, 605*c*, 605*d* and a firmware update host 610. In some implementations, each of the PSMUs include all or a part of the power supply 115. In the depicted example, the PSMUs 605*a-d* are connected to the firmware update host 610 via the management bus 195. The firmware update host 610 can transmit and receive data and commands to and from the PSMUs 605*a-d*. In one example, the firmware update host 610 can update an application firmware used by the PSMUs 605*a-d* using the management bus 195.

Each of the PSMUs 605*a-d* can control a power supply, such as the power supply 115, that supplies power to a load (e.g., the motherboard 120). In this example, the PSMUs 605*a-d* includes memories 615*a-d*, respectively, and controllers 620*a-d*, respectively. In some implementations, each of the controllers 620*a-d* can execute program instructions stored in the memory 615*a-d* on the same PSMU 605*a-d* to control the power supply. For example, each of the memories 615*a-d* can include the application firmware 130*a* and the boot loader 130*b*.

The controllers 620*a-d* can also execute commands received from the firmware update host 610. In some implementations, the controllers 620*a-d* may by default restrict access to, for example, the application firmware in the memories 615*a-d*. To execute commands in the application firmware on the controllers 620*a-d*, the firmware update host 610 can transmit a unlock command to unlock the application firmware before transmitting subsequent commands.

Through the management bus 195, the firmware update host 610 can transmit an updated application firmware and also commands to the PSMUs 605*a-d*. For example, the firmware update host 610 can read data stored in a specific location in the memories 615*a-d*. In another example, the firmware update host 610 can write data to a specific location in the memories 615*a-d*. Additionally, the firmware update host 610 can request one of the controllers 620*a-d* to calculate a checksum value for the application firmware. In another example, the firmware update host 610 can reset one or more of the PSMUs 605*a-d* to the boot loader mode.

The firmware update host 610 can also receive messages from the 620*a-d*. For example, the controllers 620*a-d* can transmit a request for a firmware update when the controller determines that the application firmware stored in the memories 615*a-d* is corrupted or outdated. For example, the controllers 620*a-d* can be configured so that when a checksum value of the application firmware image in the memories 615a-d is different from a previously stored value, the controllers 620a-d requests a replacement for the application firmware to avoid malfunctioning of the power supply.

The firmware update host 610 can be a local processing unit or a remote processing unit. In some implementations, the firmware update host 610 may be a local processing unit, such as one of the trays 110 in the architecture 100. For example, in the architecture 100, one of the trays 110 may be pre-selected or instructed to be the firmware update host 610 to update the other trays 110. In some implementations, the firmware update host 610 may be located remotely. For example, the firmware update host 610 may be a laptop computer connected to the racks 140a-c via the management bus 195 or a server connected to the data center 105 through the network 145.

In normal operation (e.g., application firmware mode), the firmware update host 610 can transmit commands to the controllers 620a-d by first transmitting an unlock command followed by subsequent commands for execution. In some implementations, the controllers 620a-d can use the method 500 to execute the received commands.

During a firmware update operation, the firmware update host 610 can transmit a restart command to the controllers 620a-d to reset the PSMUs 605a-d in the firmware update mode (e.g., boot loader mode). In some examples, the controllers 620a-d may execute operations described in the method 200 after the PSMUs 605a-d are reset. Next, the controllers 620a-d checks whether the available power is stable for completing the application firmware update process. If the available power is stable, then the controllers 620a-d can interact with the firmware update host to update the application firmware. For example, the controllers 620a-d can update the application firmware using operations in the method 300.

Depending on the implementation of the system 100, the firmware update process may be executed differently. In some implementations, the PSMUs 605a-d can be updated simultaneously. In other implementations, the firmware update host 610 can update a subset of the PSMUs 605a-d at a time. For example, the firmware update host 610 may only update the PSMUs 605 that have the batteries 190 properly connected to the power supplies 150, and the remaining PSMUs may be updated at a later time when the batteries are properly connected.

In some implementations, the firmware update host 610 can select one of the PSMUs 605a-d to be updated. For example, the firmware update host 610 may query one of the PSMUs 605a-d for the version of the application firmware stored in the PSMUs 605a-d. If the firmware update host 610 determines that the application firmware in the queried PSMU is not updated, then the firmware update host 610 may start the firmware update process in the queried PSMU. Alternatively, each PSMU may generate an update request based on a seed value, such as a serial number for the associated power supply, stored in the memory 615. Because each serial number may be unique, the requests for updating may occur at different times.

In some implementations, the firmware update host 610 can specify a specific group of the PSMUs 605a-d to be updated. For example, there may be some hot spots (e.g., hardware that is running at an elevated temperature relative to other hardware within the system 100) identified in the data center 105 (FIG. 1). The firmware update host 610 can address a group of the trays 110 (e.g., by using an address pin in the trays 110) at the hot spots in order to transmit an application firmware update to the group so that, for example, cooling fans on these trays 110 are operated at a higher speed than the surrounding trays 110.

A number of embodiments of the invention have been described. Nevertheless, it will be understood that various modifications may be made without departing from the spirit and scope of the invention. For example, although the motherboard 120 was described above as the load for the power supply 115, other electrical loads may be used. For example, the load can include network devices, integrated chips, disk-only systems, memory devices, etc.

In some implementations, more than one power supply, such as the power supply 115 may power a single motherboard, such as the motherboard 120. In other implementations, more than one motherboard may be powered by a single power supply. Various combinations, such as two power supplies powering three motherboards may also be implemented.

In other implementations, advantageous results may be achieved if the steps of the disclosed techniques were performed in a different sequence, if components in the disclosed systems were combined in a different manner, or if the components were replaced or supplemented by other components. Accordingly, other embodiments are within the scope of the following claims.

What is claimed is:

1. A method for loading instructions into a programmable power supply having memory and a battery used to supply an output of the power supply, the method comprising:
maintaining a power output for the programmable power supply during instruction loading operations of a firmware update process, the instruction loading operations comprising:
restricting access to a portion of the programmable power supply's memory, the memory coupled to a controller of the programmable power supply;
based on an interruption of power, initiating a battery backup mode;
receiving an unlock command from a remote host;
receiving, subsequent to receipt of the unlock command, instructions through an internal bus used for communication with the power supply, wherein the received instructions are stored in the portion of the memory; and
based on receipt of the unlock command, restoring access to the portion of the memory so that the controller can execute the received instructions for a predetermined period of time that begins upon receipt of the unlock command.

2. The method of claim 1, wherein the instruction loading operations comprise modifying instructions previously stored in the portion of the memory.

3. The method of claim 1, wherein the instructions comprise firmware.

4. The method of claim 3, wherein the firmware comprises data and executable instructions.

5. The method of claim 1, wherein restricting access to the portion comprises preventing the controller from executing instructions stored in the portion.

6. The method of claim 1, wherein the bus comprises a system management bus.

7. The method of claim 1, wherein restoring access to the portion of the memory comprises initiating an alternating current (AC) powered mode, wherein an AC power source is used to supply an output of the power supply.

8. The method of claim 1, further comprising receiving a query through the internal bus, the query comprising a response as to whether the received instructions were installed successfully.

9. A non-transitory computer storage medium encoded with a computer program, the program comprising instructions that when executed by one or more computers cause the one or more computers to perform operations comprising:
maintaining a power output for a programmable power supply during instruction loading operations of a firmware update process, the programmable power supply comprising a memory and a battery that is used to supply an output of the power supply, the instruction loading operations comprising:
restricting access to a portion of the programmable power supply's memory, the memory coupled to a controller of the programmable power supply;
based on an interruption of power, initiating a battery backup mode;
receiving an unlock command from a remote host;
receiving, subsequent to receipt of the unlock command, instructions through an internal bus used for communication with the power supply, wherein the received instructions are stored in the portion of the memory; and
based on receipt of the unlock command, restoring access to the portion of the memory so that the controller can execute the received instructions for a predetermined period of time that begins upon receipt of the unlock command.

10. The non-transitory computer storage medium of claim 9, wherein the instruction loading operations comprise modifying instructions previously stored in the portion of the memory.

11. The non-transitory computer storage medium of claim 9, wherein the instructions comprise firmware.

12. The non-transitory computer storage medium of claim 11, wherein the firmware comprises data and executable instructions.

13. The non-transitory computer storage medium of claim 9, wherein restricting access to the portion comprises preventing the controller from executing instructions stored in the portion.

14. The non-transitory computer storage medium of claim 9, wherein the bus comprises a system management bus.

15. The non-transitory computer storage medium of claim 9, wherein restoring access to the portion of the memory comprises initiating an alternating current (AC) powered mode, wherein an AC power source is used to supply an output of the power supply.

16. The non-transitory computer storage medium of claim 9, further comprising receiving a query through the internal bus, the query comprising a response as to whether the received instructions were installed successfully.

17. A system of one or more computers configured to perform operations comprising:
maintaining a power output for a programmable power supply during instruction loading operations of a firmware update process, the programmable power supply comprising a memory and a battery that is used to supply an output of the power supply, the instruction loading operations comprising:
restricting access to a portion of the programmable power supply's memory, the memory coupled to a controller of the programmable power supply;
based on an interruption of power, initiating a battery backup mode;
receiving an unlock command from a remote host;
receiving, subsequent to receipt of the unlock command, instructions through an internal bus used for communication with the power supply, wherein the received instructions are stored in the portion of the memory; and
based on receipt of the unlock command, restoring access to the portion of the memory so that the controller can execute the received instructions for a predetermined period of time that begins upon receipt of the unlock command.

18. The system of claim 17, wherein the instruction loading operations comprise modifying instructions previously stored in the portion of the memory.

19. The system of claim 17, wherein the instructions comprise firmware.

20. The system of claim 19, wherein the firmware comprises data and executable instructions.

21. The system of claim 17, wherein restricting access to the portion comprises preventing the controller from executing instructions stored in the portion.

22. The system of claim 17, wherein the bus comprises a system management bus.

23. The system of claim 17, wherein restoring access to the portion of the memory comprises initiating an alternating current (AC) powered mode, wherein an AC power source is used to supply an output of the power supply.

24. The system of claim 17, further comprising receiving a query through the internal bus, the query comprising a response as to whether the received instructions were installed successfully.

25. The method of claim 1, wherein the power comprises alternating current (AC) power.

* * * * *

UNITED STATES PATENT AND TRADEMARK OFFICE
CERTIFICATE OF CORRECTION

| | | |
|---|---|---|
| PATENT NO. | : 8,775,779 B2 | Page 1 of 1 |
| APPLICATION NO. | : 12/957835 | |
| DATED | : July 8, 2014 | |
| INVENTOR(S) | : Krieger et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 73 days.

Signed and Sealed this
Twenty-third Day of February, 2016

Michelle K. Lee
*Director of the United States Patent and Trademark Office*